US012810057B2

(12) United States Patent
Chien et al.

(10) Patent No.: US 12,810,057 B2
(45) Date of Patent: Nov. 24, 2026

(54) SUMMARY GENERATION DEVICE AND SUMMARY GENERATION METHOD

(71) Applicant: DELTA ELECTRONICS, INC., Taoyuan City (TW)

(72) Inventors: Shih-Chieh Chien, Taoyuan City (TW); Chi-Yueh Lin, Taoyuan City (TW); Jiang-Chun Chen, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 216 days.

(21) Appl. No.: 18/795,120

(22) Filed: Aug. 5, 2024

(65) Prior Publication Data

US 2025/0278559 A1 Sep. 4, 2025

(30) Foreign Application Priority Data

Mar. 1, 2024 (CN) ......................... 202410232138.8

(51) Int. Cl.
*G06F 40/279* (2020.01)
*G06F 40/177* (2020.01)

(52) U.S. Cl.
CPC .......... *G06F 40/177* (2020.01); *G06F 40/279* (2020.01)

(58) Field of Classification Search
CPC ............................. G06F 40/177; G06F 40/279
See application file for complete search history.

(56) References Cited

U.S. PATENT DOCUMENTS

| | | | |
|---|---|---|---|
| 5,761,637 A | 6/1998 | Chino |
| 6,999,933 B2 | 2/2006 | Hoi |
| 8,612,211 B1 | 12/2013 | Shires et al. |
| 2002/0133339 A1 | 9/2002 | Gudorf et al. |

(Continued)

FOREIGN PATENT DOCUMENTS

| | | |
|---|---|---|
| CN | 106446109 A | 2/2017 |
| CN | 110837557 A | 2/2020 |

(Continued)

OTHER PUBLICATIONS

Omar Almutiry, Automatic Key Phrase Extraction, Oct. 27, 2021, International Conference on Engineering and Emerging Technologies, pp. 1-7 (Year: 2021).*

(Continued)

*Primary Examiner* — Tam T Tran
(74) *Attorney, Agent, or Firm* — CKC & Partners Co., LLC

(57) ABSTRACT

A summary generation device including an input-output circuit and a processor is disclosed. The processor is configured to perform: operation 1: generating original text data according to a voice data, and generating a voice to text correspondence table between the voice data and the original text data; operation 2: retrieving at least one of several original sentences to generate at least one key sentence according to the original text data; operation 3: correcting the at least one key sentence based on the voice data, and updating at least one of several original sentences corresponding to the at least one key sentence; operation 4: repeating the operation 2 and the operation 3, until the at least one key sentence is determined that there is no need to correct; and operation 5: generating a summary according to at least one of updated key sentence.

17 Claims, 12 Drawing Sheets

130C

(56) References Cited

U.S. PATENT DOCUMENTS

| | | | | |
|---|---|---|---|---|
| 2018/0012598 | A1 | 1/2018 | Thirukovalluru et al. | |
| 2022/0189468 | A1 | 6/2022 | Hirao et al. | |
| 2023/0223016 | A1* | 7/2023 | Konam | G06F 40/284<br>704/231 |
| 2025/0039336 | A1* | 1/2025 | Lee | H04N 7/155 |
| 2025/0061280 | A1* | 2/2025 | Yan | G06F 16/3331 |

FOREIGN PATENT DOCUMENTS

| | | | |
|---|---|---|---|
| CN | 112562669 | A | 3/2021 |
| CN | 114860907 | A | 8/2022 |
| CN | 117151047 | A | 12/2023 |
| CN | 117376653 | A | 1/2024 |
| JP | 2020-118929 | A | 8/2020 |
| TW | I764328 | B | 5/2022 |
| TW | M633528 | U | 10/2022 |

OTHER PUBLICATIONS

Surbhi Bhatia, A Comparative Study of Opinion Summarization Techniques, Nov. 17, 2020, Transactions On Computational Social Systems, vol. 8, No. 1, pp. 110-117 (Year: 2020).*

* cited by examiner

134A

SUMMARY GENERATION DEVICE AND SUMMARY GENERATION METHOD

RELATED APPLICATIONS

This application claims priority to China Application Serial Number 202410232138.8, filed Mar. 1, 2024, which is herein incorporated by reference.

BACKGROUND

Field of Invention

The present application relates to a summary generation device and a summary generation method. More particularly, the present application relates to a summary generation device and a summary generation method with speech to text function.

Description of Related Art

The generation of the summary of the voice conference utilizes the speech recognition technology of converting the conference recording into text and extracting key information and core content through natural language processing and text summary algorithms, and a concise conference summary is generated. This automated summary generation method can save time and manpower, help participants quickly understand the key points of the meeting, assist in decision-making, and facilitate subsequent work. Currently, many voice conference summary generation software or services have been proposed.

However, in the field of voice conference summary generation, the problem of speech recognition errors exists, and the voice recognition errors will inevitably affect the summary of the voice conference. Especially technical discussion meetings are full of proper nouns, newly created words, abbreviations, pronouns, etc., which are often words only known by the participants or even the speakers. This is also a problem that cannot be solved by general speech recognition models. Therefore, to avoid wrong summaries generated due to speech recognition errors, which causes cognitive errors and misleading, manual correction is still an unavoidable and necessary measure. However, manual correction is labor-intensive and time-consuming.

Therefore, how to propose a content correction method applied to voice conference summary generation, which can correct speech recognition errors with the least labor cost, providing the original sentence corresponding to the conference summary, and ensuring the correctness and traceability of the conference summary, is one of the problems to be solved in this field.

SUMMARY

The disclosure provides a summary generation device includes an input-output circuit and a processor. The input-output circuit is configured to receive a voice data. The processor is coupled to the input-output circuit. The processor is configured to perform the following operations: operation 1: generating original text data according to the voice data, and generating a voice to text correspondence table between the voice data and the original text data, in which the original text data includes several original sentences, the voice to text correspondence table includes several original sentences and a starting position and an ending position in the voice data corresponding to each of several original sentences; operation 2: retrieving at least one of several original sentences to generate at least one key sentence according to the original text data; operation 3: correcting the at least one key sentence based on the voice data, and updating at least one of several original sentences corresponding to the at least one key sentence; operation 4: repeating the operation 2 and the operation 3, until the at least one key sentence is determined that there is no need to correct; and operation 5: generating a summary according to at least one of updated key sentence.

The disclosure provides a summary generation device. The summary generation device includes an input-output circuit and a processor. The input-output circuit is configured to receive a voice data. The processor is coupled to the input-output circuit. The processor is configured to perform the following operations: operation 1: generating original text data according to the voice data, and generating a voice to text correspondence table between the voice data and the original text data, in which the original text data includes several original sentences, the voice to text correspondence table includes several original sentences and a starting position and an ending position in the voice data corresponding to each of several original sentences; operation 2: retrieving at least one of several original sentences to generate at least one key sentence according to the original text data; operation 3: generating a summary according to the at least one key sentence, and generating an association table, in which the association table is constructed according to an association between at least one summary sentence of the summary and the at least one key sentence; operation 4: correcting and updating the original text data based on the voice data by utilizing the association table and the voice to text correspondence table; and operation 5: repeating the operation 2 to the operation 4, until the original text data is determined that there is no need to correct.

The disclosure provides a summary generation method. The summary generation method includes the following operations: operation 0: receiving a voice data; operation 1: generating original text data according to the voice data, and generating a voice to text correspondence table between the voice data and the original text data, in which the original text data includes several original sentences, in which the voice to text correspondence table includes several original sentences and a starting position and an ending position in the voice data corresponding to each of several original sentences; operation 2: retrieving at least one of several original sentences to generating at least one key sentence according to the original text data; operation 3: correcting the at least one key sentence based on the voice data, and updating at least one of several original sentences corresponding to the at least one key sentence; operation 4: repeating the operation 2 and the operation 3, until the at least one key sentence is determined that there is no need to correct; and operation 5: generating a summary according to at least one of updated key sentence.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

The following disclosure provides many different embodiments or examples configured to implement different features of the invention. The components and configurations of the specific examples are used to simplify the embodiments of the present disclosure in the following discussion. Any examples discussed are for illustrative purposes only and do not limit the scope and significance of the embodiments of the present disclosure or its examples in any way. The operations of "determining" or "obtaining" used in this article may be referred to as operations such as "generating" or "calculating".

Figure 1:
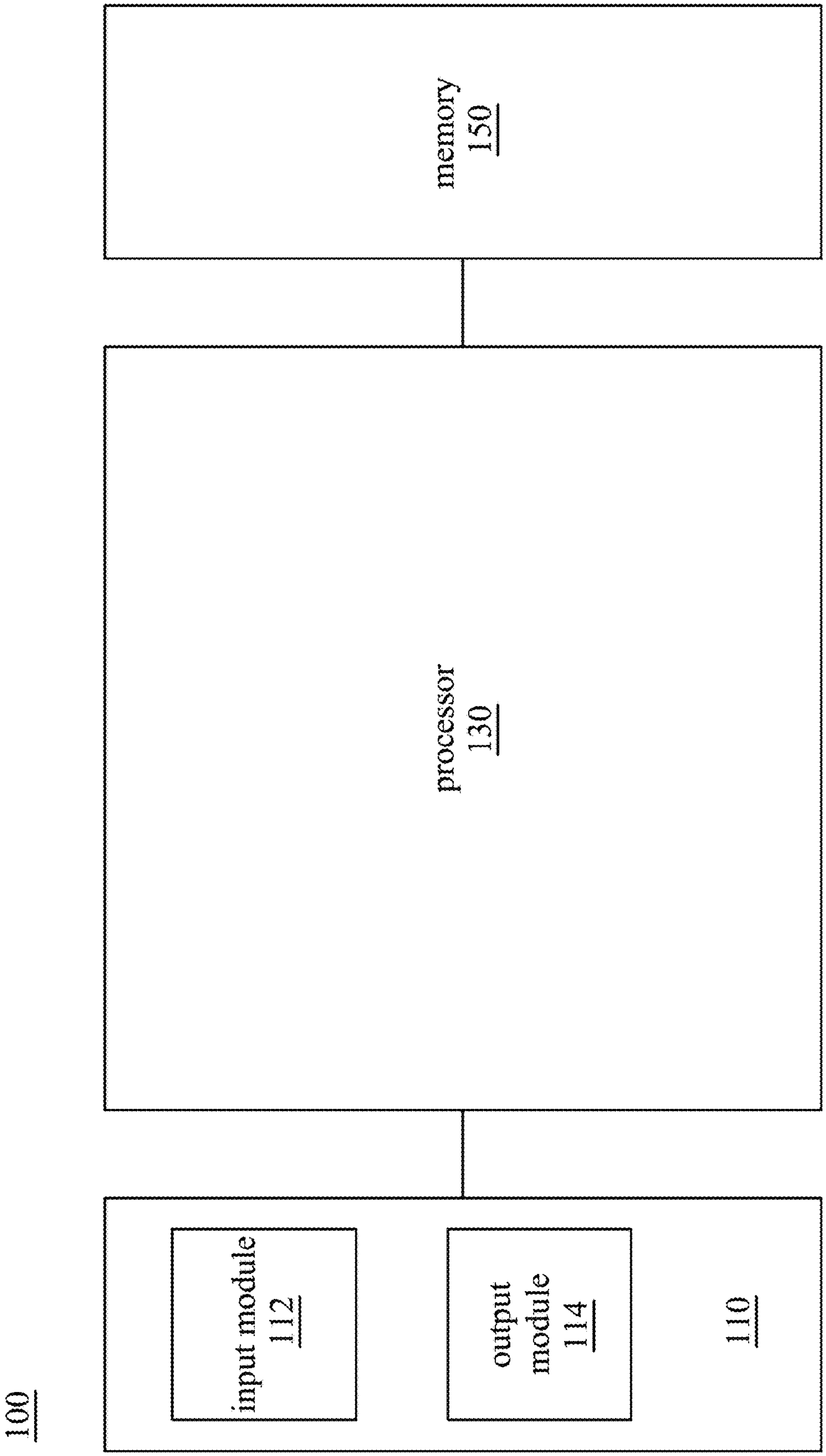
FIG. 1 is a schematic diagram illustrating a summary generation device in accordance with some embodiments of the present disclosure.

Reference is made to FIG. 1. FIG. 1 is a schematic diagram illustrating a summary generation device 100 in accordance with some embodiments of the present disclosure. The summary generation device 100 includes an input-output circuit 110, a processor 130, and a memory 150.

In the connection relationship, the input-output circuit 110 is coupled to the processor 130, and the processor 130 is coupled to the memory 150. The detailed operation method of the summary generation device 100 in FIG. 1 will be explained with reference to FIG. 2 to FIG. 11 below.

In FIG. 1, the input-output circuit 110 includes an input module 112 and an output module 114.

Figure 2:
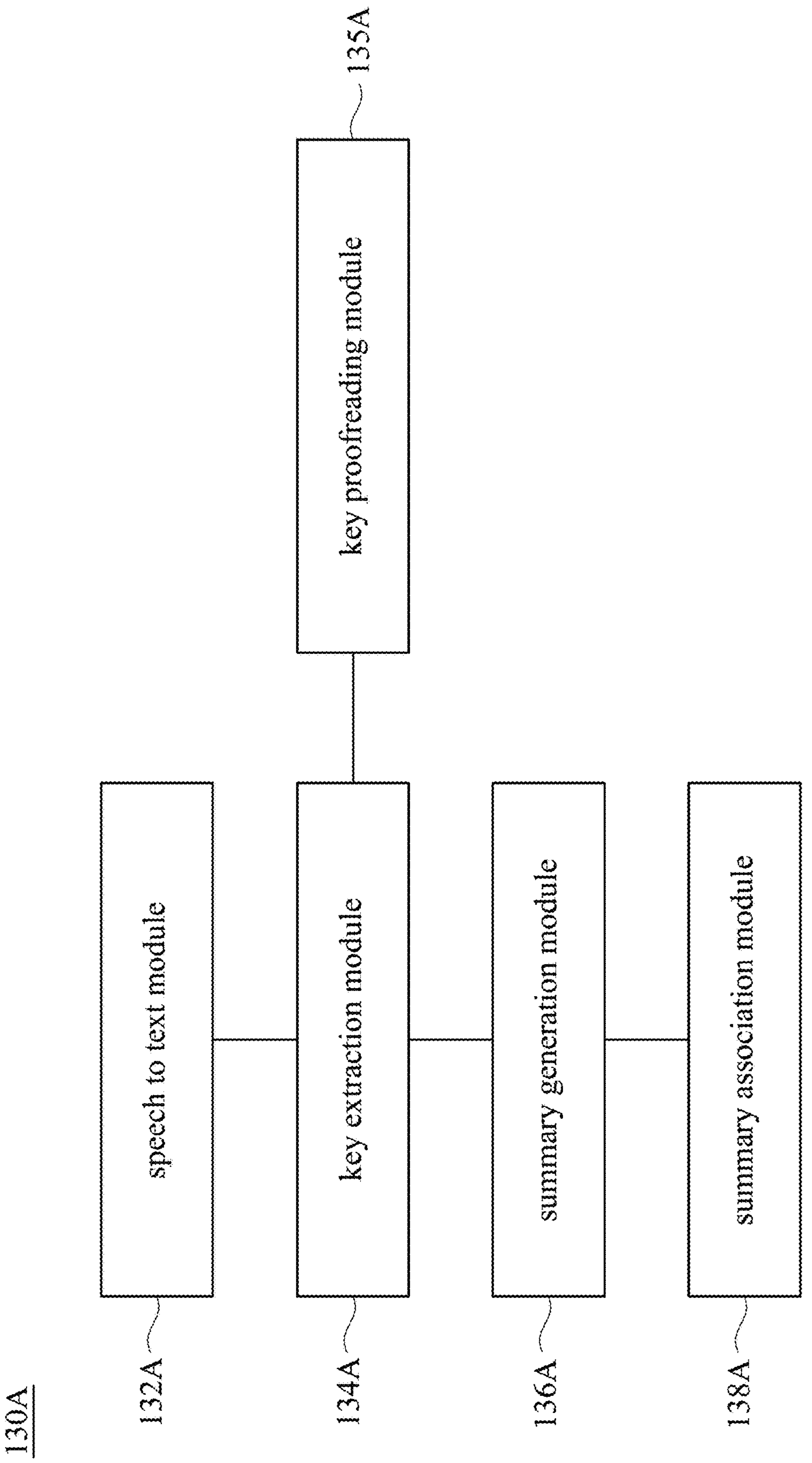
FIG. 2 is a schematic diagram illustrating a processor in accordance with some embodiments of the present disclosure.

Reference is made to FIG. 2. FIG. 2 is a schematic diagram illustrating a processor 130A in accordance with some embodiments of the present disclosure. The processor 130A in FIG. 2 is an embodiment of the processor 130 in FIG. 1.

As illustrated in FIG. 2, the processor 130A includes a speech to text module 132A, a key extraction module 134A, a key proofreading module 135A, a summary generation module 136A and a summary association module 138A.

In the connection relationship, the speech to text module 132A is coupled to the key extraction module 134A. The key proofreading module 135A and the summary generation module 136A are coupled to the key extraction module 134A, and the summary association module 138A is coupled to the summary generation module 136A.

Figure 3:
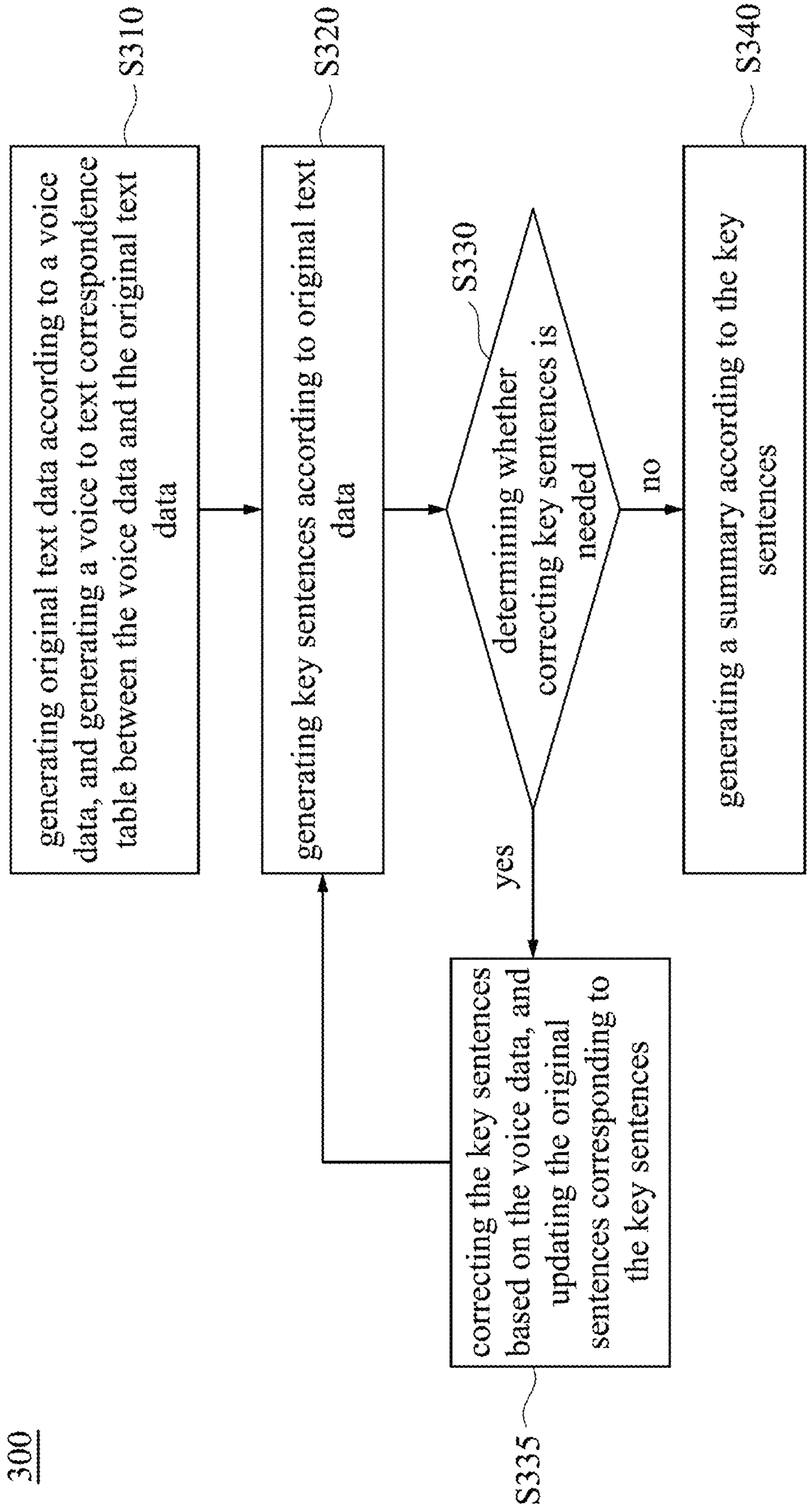
FIG. 3 is a flowchart illustrating a summary generation method in accordance with some embodiments of the present disclosure.

FIG. 3 is a flowchart illustrating a summary generation method 300 in accordance with some embodiments of the present disclosure.

The summary generation method 300 can be applied to the summary generation device 100 in FIG. 1 or a system with the same or similar structure. In order to make the description simple, the following will take FIG. 1 and FIG. 2 as examples to describe the operation method. However, the present invention is not limited to the application of FIG. 1 and FIG. 2.

Reference is made to FIG. 3. The summary generation method 300 includes the following operations S310 to S340. Details of the summary generation method 300 will be explained below with reference to FIG. 1 and FIG. 2.

In operation S310, original text data is generated according to a voice data, and a voice to text correspondence table between the voice data and the original text data is generated. In some embodiments, in operation S310, the input module 112 in FIG. 1 receives the voice data, and the speech to text module 132A in FIG. 2 generates the original text data according to the voice data. Various speech-to-text methods are within the implementation of the present disclosure.

In some embodiments, the voice to text correspondence table includes several original sentences and a starting position and an ending position in the voice data corresponding to each of the original sentences. In some embodiments, the starting position and the ending position are the time points of the voice data respectively. That is, through the markings of the starting position and the ending position, we can know the paragraph of the voice data (part of the voice data) corresponding to each of the original sentences.

In some embodiments, the voice to text correspondence table is shown as the following Table 1.

TABLE 1

| original sentence | starting position | ending position |
|---|---|---|
| O1 | SP1 | EP1 |
| O2 | SP2 | EP2 |
| O3 | SP3 | EP3 |
| . . . | . . . | . . . |

According to the speech-to-text correspondence table mentioned above, it can be known that the original sentence O1 corresponds to the starting position SP1 and the ending position EP1, the original sentence O2 corresponds to the starting position SP2 and the ending position EP2, the original sentence O3 corresponds to the starting position SP3 and the ending position EP3.

In operation S320, the key sentences are generated according to the original text data. In some embodiments, operation S320 is performed by the key extraction module 134A as illustrated in FIG. 2. The implementation of operation S320 will be described in detail below with reference to FIG. 4A.

Figure 4A:
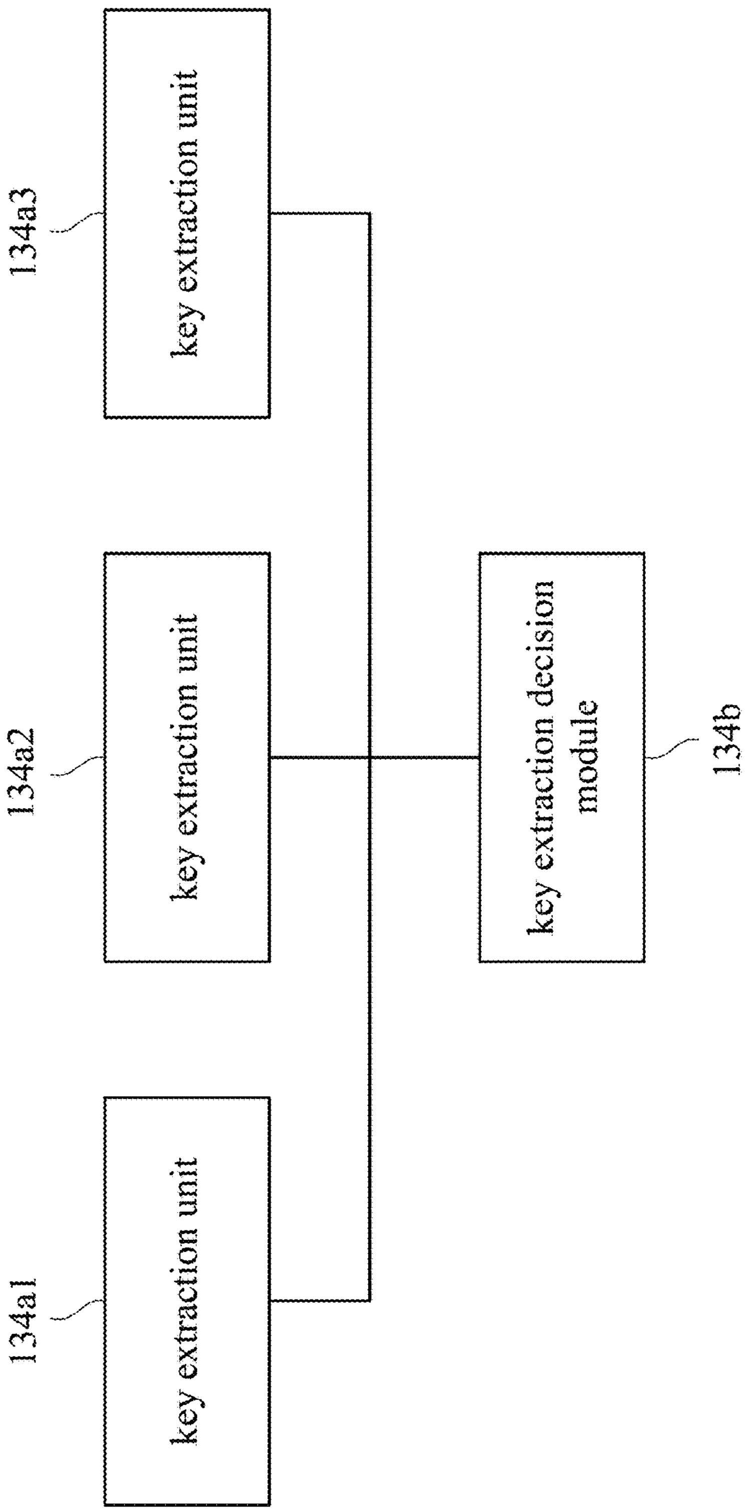
FIG. 4A is a schematic diagram illustrating a key extraction module in accordance with some embodiments of the present disclosure.

Reference is made to FIG. 4A. FIG. 4A is a schematic diagram illustrating a key extraction module 134A in accordance with some embodiments of the present disclosure.

In some embodiments, in operation S320, the key extraction module 134A retrieves (or extracts, extracts) at least one of the original sentence to generate at least one of the key sentence.

Various implementations of retrieving at least one of the original sentences and generating at least one of the key sentences are within the scope of the present disclosure. For example, in an embodiment, through TF-IDF algorithm. The TF-IDF algorithm includes two parts: term frequency (TF) and inverse document frequency (IDF). The term frequency refers to the frequency with which a given word appears in the document, and the inverse document frequency is used to deal with the problem of commonly used words. In the TF-IDF algorithm, term frequency and sentence position are used as features to calculate the importance of the original sentence (the score of the original sentence) and the order of the original sentence in the document are ranked. According to the preset importance threshold, the original sentence with a score higher than the importance threshold is retrieved.

In some embodiments, operation S320 further includes extracting several alternative key sentence groups from the original text data according to extraction ratio, and extracting several key sentences from alternative key sentence groups according to the preset key extraction ratio.

Reference is made to FIG. 4A together. As illustrated in FIG. 4A, the key extraction module 134A includes key extraction units 134*a*1 to 134*a*3 and a key extraction decision module 134*b*. In the connection relationship, each of the key extraction units 134*a*1 to 134*a*3 couples to key extraction decision module 134*b*. In some embodiments, the key extraction units 134*a*1 to 134*a*3 adopt different extraction methods. Different extraction methods include the following operations: (1) taking term frequency and original sentence position as sentence features, calculating the similarity between the original sentences, and ranking the order of the original sentences in the document based on the importance of the words in the text. (2) ranking by estimating the importance of the original sentences according to the frequency of each word appearing in the original sentence, the number of times the word appears in all original sentences, the number of original sentences including words in the text, and other feature groups. (3) Ranking by estimating the similarity scores between the original sentence and other original sentences based on the undirected weighted graph constructed based on the similarities between the original sentences, etc. Various extraction methods are included in the embodiments of the present disclosure, and the embodiments of the present disclosure are not limited above.

In an embodiment, each of the key extraction units 134*a*1 to 134*a*3 extracts part of the original sentences as the alternative key sentences according to an extraction ratio. For example, when the extraction ratio is 30%, each of the key extraction units 134*a*1 to 134*a*3 extracts 30% of the original sentences from the original text data as the alternative key sentences according to different extraction methods.

Figure 4B:
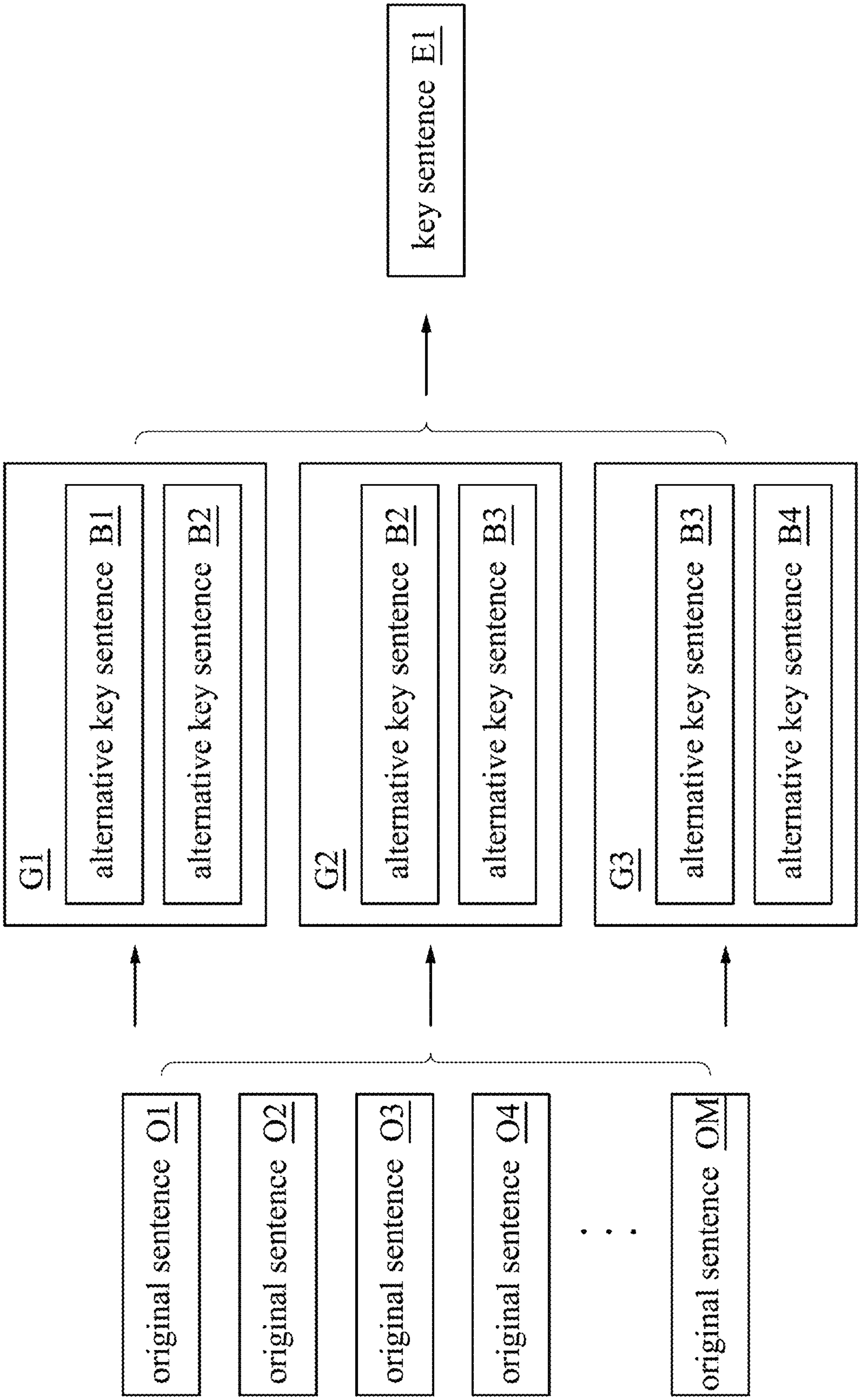
FIG. 4B is a schematic diagram illustrating an alternative key sentence in accordance with some embodiments of the present disclosure.

Reference is made to FIG. 4B together. FIG. 4B is a schematic diagram illustrating an alternative key sentence in accordance with some embodiments of the present disclosure. Assume that the original text data includes original sentences O1 to OM. The alternative key sentence group G1 extracted by the key extraction unit 134*a*1 includes alternative key sentences B1 and B2, the alternative key sentence group G2 extracted by the key extraction unit 134*a*2 includes alternative key sentences B2 and B3, the alternative key sentence group G3 extracted by the key extraction unit 134*a*3 includes alternative key sentences B3 and B4. Alternative key sentences B1, B2 and B3 respectively correspond to original sentences O1, O2 and O3.

Then, according to the alternative key sentence groups G1 to G3 extracted by the key extraction units 134*a*1 to 134*a*3, the key extraction decision module 134*b* of FIG. 4A extracts the key sentence E1 according to the preset key extraction ratio from several alternative key sentence groups G1 to G3. In some embodiments, the key extraction ratio is the ratio of the key sentence relative to the original sentence.

In some embodiments, the key extraction decision module 134*b* extracts the key sentence E1 from the alternative key sentence groups G1 to G3 by intersection or union. For example, in an embodiment, the key extraction decision module 134*b* can extract the key sentence E1 according to the union of the alternative key sentence groups G1 to G3. In another embodiment, the key extraction decision module 134*b* can extract the key sentence E1 according to the intersection of the alternative key sentence groups G1 to G3.

Figure 5:
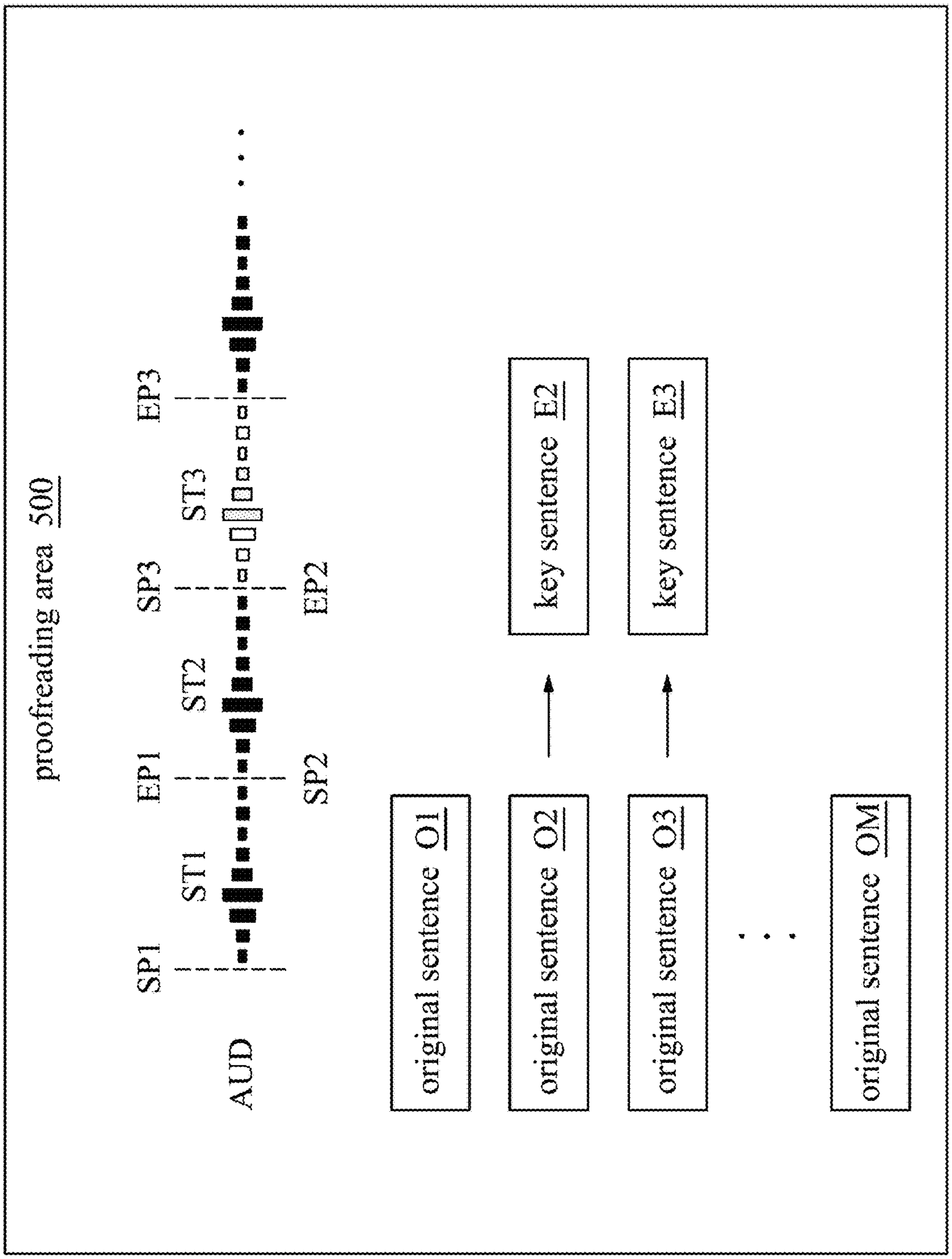
FIG. 5 is a schematic diagram illustrating a proofreading area in accordance with some embodiments of the present disclosure.

Reference is made to FIG. 5 together. FIG. 5 is a schematic diagram illustrating a proofreading area 500 in accordance with some embodiments of the present disclosure. As illustrated in FIG. 5, the original text data includes original sentences O1 to OM. The original sentence O1 corresponds to the paragraph ST1 of the voice data AUD. Paragraph ST1 includes a starting position SP1 and an ending position EP1. The original sentence O2 corresponds to the paragraph ST2 of the voice data AUD. The paragraph ST2 includes a starting position SP2 and an ending position EP2. The original sentence O3 corresponds to paragraph ST3 of the voice data AUD. The paragraph ST3 includes a starting position SP3 and an ending position EP3.

In the embodiment of FIG. 5, the key sentence E2 and the key sentence E3 extracted by the key extraction module 134A correspond to the original sentence O2 and the original sentence O3 respectively.

Reference is made to FIG. 3 again. In operation S330, whether correcting key sentences is needed is determined. In some embodiments, operation S330 is performed by the key proofreading module 135A in FIG. 2. In some embodiments, the output module 114 in FIG. 1 displays the key sentences (for example, key sentences E2 and E3 in FIG. 5) at the proofreading area 500 as illustrated in FIG. 5. In some embodiments, according to the displayed proofreading area 500, users can browse the key sentences and can determine whether the key sentence needs to be corrected.

In some embodiments, when the user determines that the key sentences need to be corrected, the user sends the command to the summary generation device 100 through the input module 112 as shown in FIG. 1.

In some embodiments, when the processor 130 receives the command of correcting the key sentences, operation S335 is performed. When the processor 130 does not receive the command of correcting the key sentences, or when the processor 130 receives a command of not correcting the key sentences, operation S340 is performed.

In operation S335, correcting the key sentences based on the voice data, and updating the original sentences corresponding to the key sentences. In some embodiments, in operation S335, when the processor 130 receives the command of correcting the key sentences, the processor 130 retrieves the key sentences according to the key sentences corresponding to the command. For example, reference is made to FIG. 5 together. When the command corresponds to the key sentence E2, according to the command, the processor 130 retrieves the key sentence E2.

In some embodiments, according to the retrieved key sentences, the output module 114 plays the voice data of the original sentence corresponding to the retrieved key sentences.

For example, in some embodiments, when retrieving the key sentence E2, the processor 130 as illustrated in FIG. 1 searches the original sentence O2 corresponding to the key sentence E2 according to key sentence E2. Then, according to the original sentence O2, according to the voice to text correspondence table as illustrated in Table 1, the output module 114 plays the paragraph ST2 of the voice data AUD of the original sentence O2 corresponding to the retrieved key sentence.

In some embodiments, when the key sentence is corrected, the key proofreading module 135A updates the original sentence corresponding to the key sentence. For example, in an embodiment, when the key sentence E2 is corrected, the key proofreading module 135A updates the original sentence O2 corresponding to the key sentence E2.

Reference is made to FIG. 3 again. As illustrated in FIG. 3, in some embodiments, after performing operation S335, operation S320 is performed again. The key sentences are generated according to the corrected original sentences. The operation S330 is then performed again, so as to determine whether to correct key sentence again.

In the summary generation method 300 as described above, users only need to browse the key sentences to determine whether to correct the original text data without browsing the entire original text data.

Figure 6:
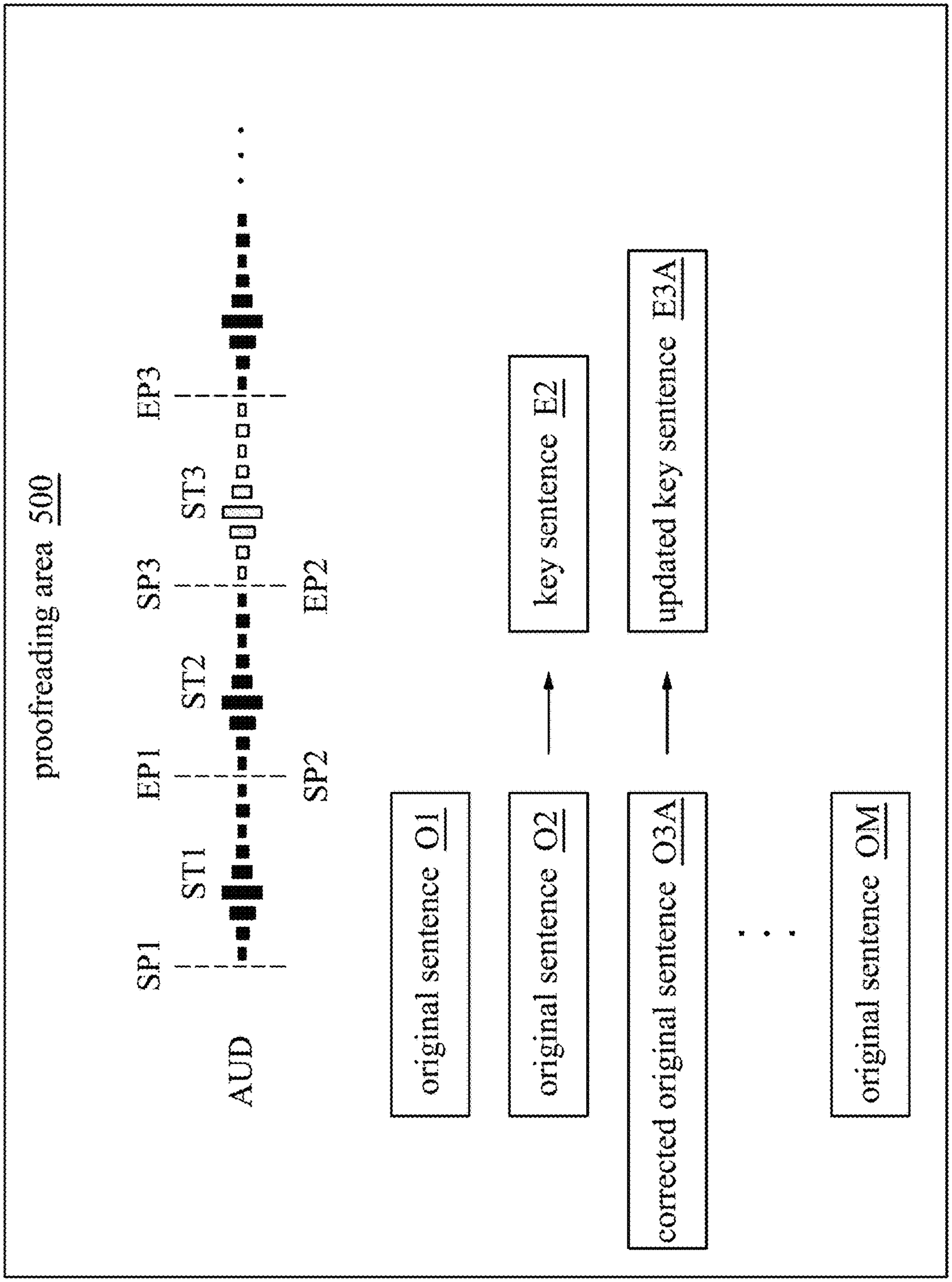
FIG. 6 is a schematic diagram illustrating a proofreading area in accordance with some embodiments of the present disclosure.

Reference is made to FIG. 6 together. FIG. 6 is a schematic diagram illustrating a proofreading area 500 in accordance with some embodiments of the present disclosure. As illustrated in FIG. 6, after updating the original sentence O3 in FIG. 5, the corrected original sentence O3A in FIG. 6 are generated. According to the corrected original text data, the extracted key sentences include the key sentence E2 and the updated key sentence E3A. The key sentence E2 corresponds to the original sentence O2, the updated key sentence E3A corresponds to the corrected original sentence O3A.

In some embodiments, the processor 130 as illustrated in FIG. 1 repeats to perform operation S320, operation S330, and operation S335, until no key sentences need to be corrected, and then operation S340 is performed.

In operation S340, a summary is generated according to the key sentences. In some embodiments, operation S340 is performed by the summary generation module 136A as illustrated in FIG. 2. The method of generating summary can be performed by summary generation algorithm, counting the occurrences of keywords or key phrases, sentence association pattern, or any other summary generation methods are within the scope of the present disclosure.

In some embodiments, in operation S340, the summary association module 138A as illustrated in FIG. 2 generates the association table. The embodiments of the association table will be explained later and will not be described in detail here.

In some embodiments, the output module 114 as illustrated in FIG. 1 outputs the generated summary, including displaying summary by a display device.

Figure 7:
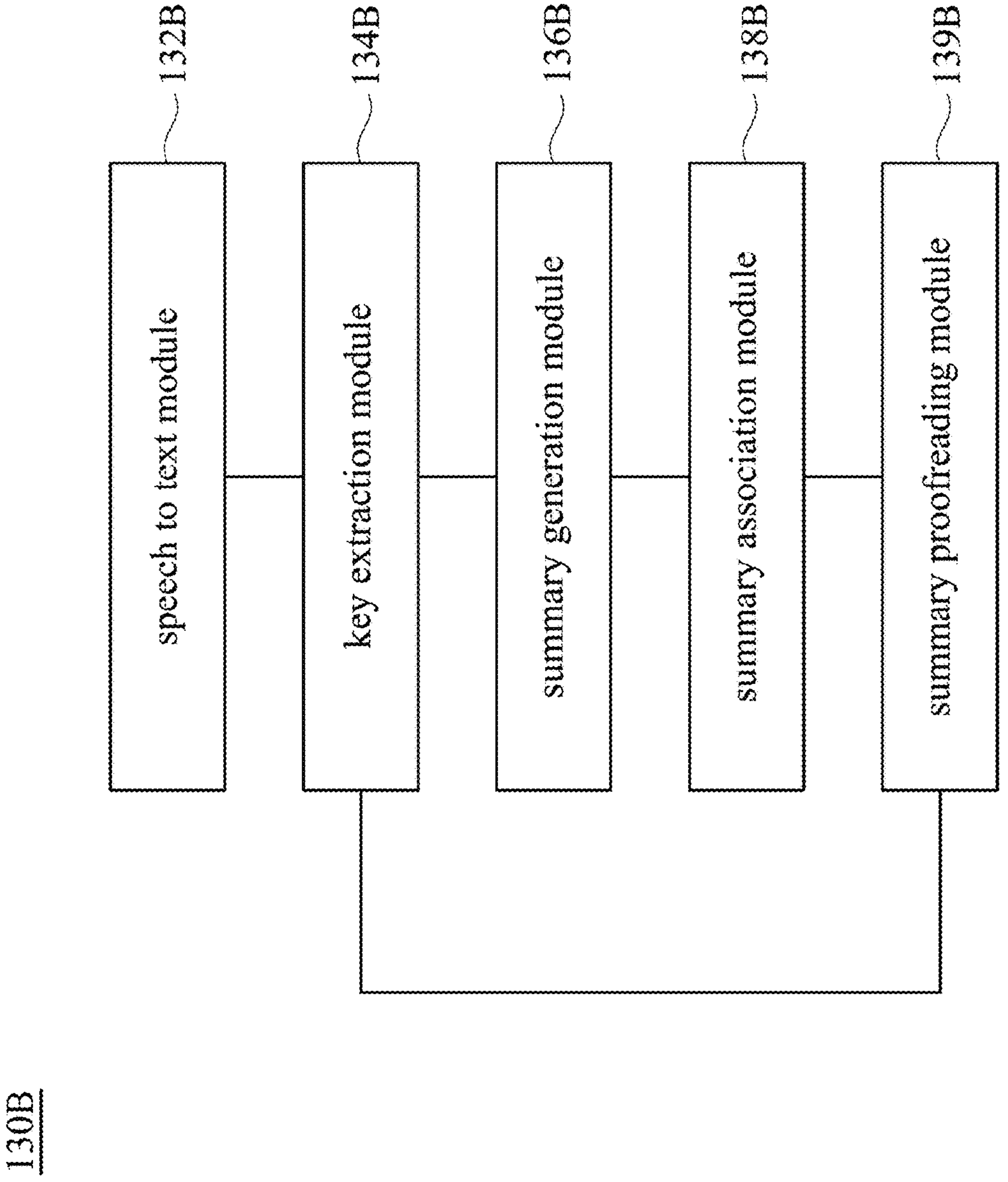
FIG. 7 is a schematic diagram illustrating a processor in accordance with some embodiments of the present disclosure.

Reference is made to FIG. 7. FIG. 7 is a schematic diagram illustrating a processor 130B in accordance with some embodiments of the present disclosure. The processor 130B in FIG. 7 is another embodiment of the processor 130 in FIG. 1.

As illustrated in FIG. 7, the processor 130B includes a speech to text module 132B, a key extraction module 134B, a summary generation module 136B, a summary association module 138B and a summary proofreading module 139B.

In the connection relationship, the speech to text module 132B is coupled to the key extraction module 134B, the key extraction module 134B is coupled to the summary generation module 136B, the summary generation module 136B is coupled to the summary association module 138B, the summary association module 138B is coupled to summary proofreading module 139B, and the summary proofreading module 139B is coupled to the key extraction module 134B.

Figure 8:
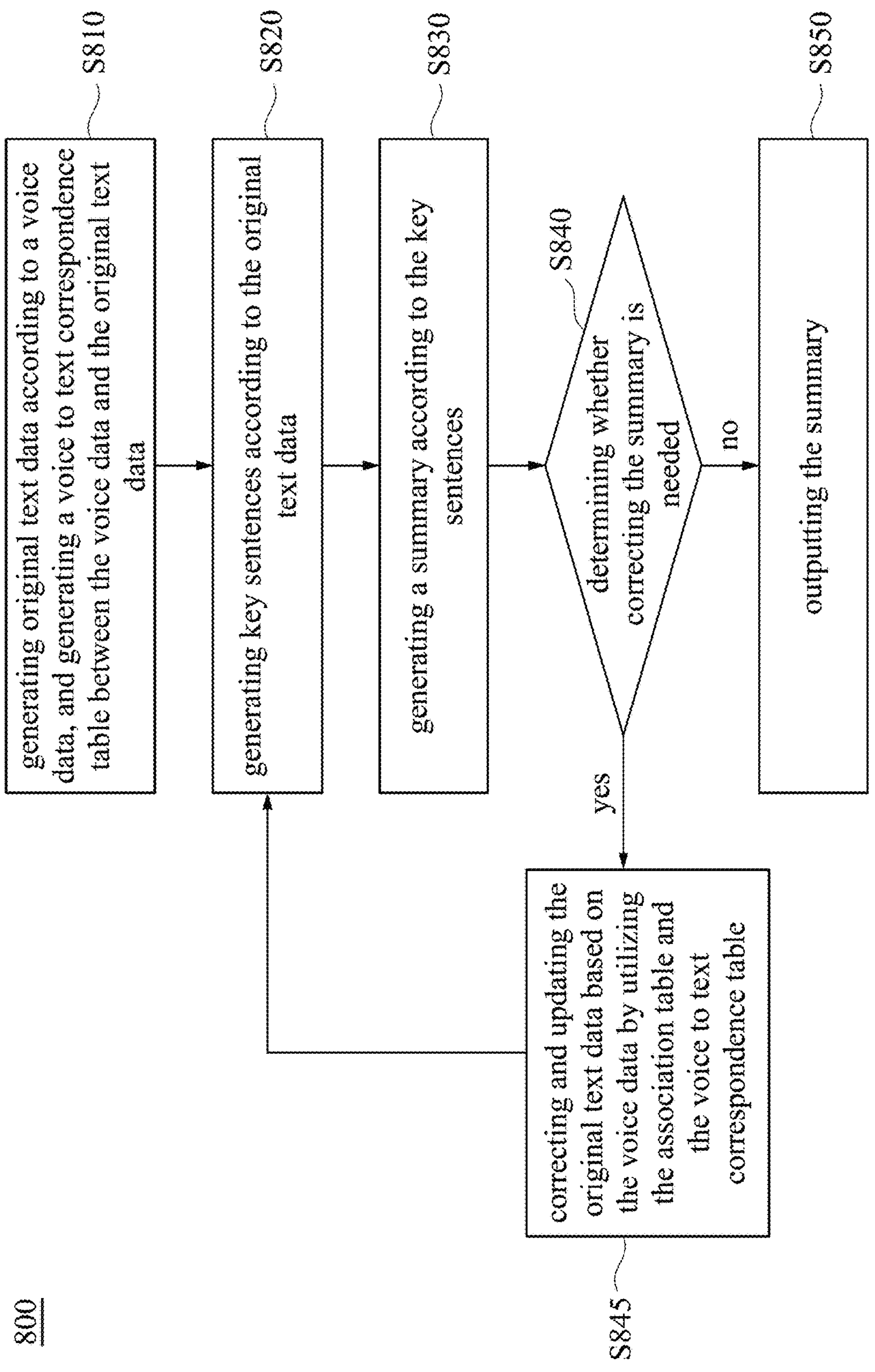
FIG. 8 is a flowchart illustrating another summary generation method in accordance with some embodiments of the present disclosure.

Reference is made to FIG. 8 together. FIG. 8 is a flowchart illustrating another summary generation method 800 in accordance with some embodiments of the present disclosure.

The summary generation method 800 can be applied to the summary generation device 100 in FIG. 1 or a system with the same or similar structure. In order to make the description simple, the following will take FIG. 1 and FIG. 7 as examples to describe the operation method. However, the embodiments of the present disclosure are not limited to the application of FIG. 1 and FIG. 7.

Reference is made to FIG. 8. The summary generation method 800 includes the following operations S810 to S850. The details of summary generation method 800 will be explained with reference to FIG. 1 and FIG. 7 below.

In operation S810, original text data is generated according to a voice data, and a voice to text correspondence table is generated between the voice data and the original text data. In some embodiments, operation S810 is performed by the speech to text module 132B as illustrated in FIG. 7. The implementation of operation S810 is similar to operation S310 in FIG. 3 and will not be described in detail here.

In operation S820, key sentences are generated according to the original text data. In some embodiments, operation S820 is performed by the key extraction module 134B as illustrated in FIG. 7. The implementation of operation S820 is similar to operation S320 in FIG. 3 and will not be described in detail here.

In operation S830, a summary is generated according to the key sentences. In some embodiments, operation S830 is performed by the summary generation module 136B as illustrated in FIG. 7.

Figure 9:
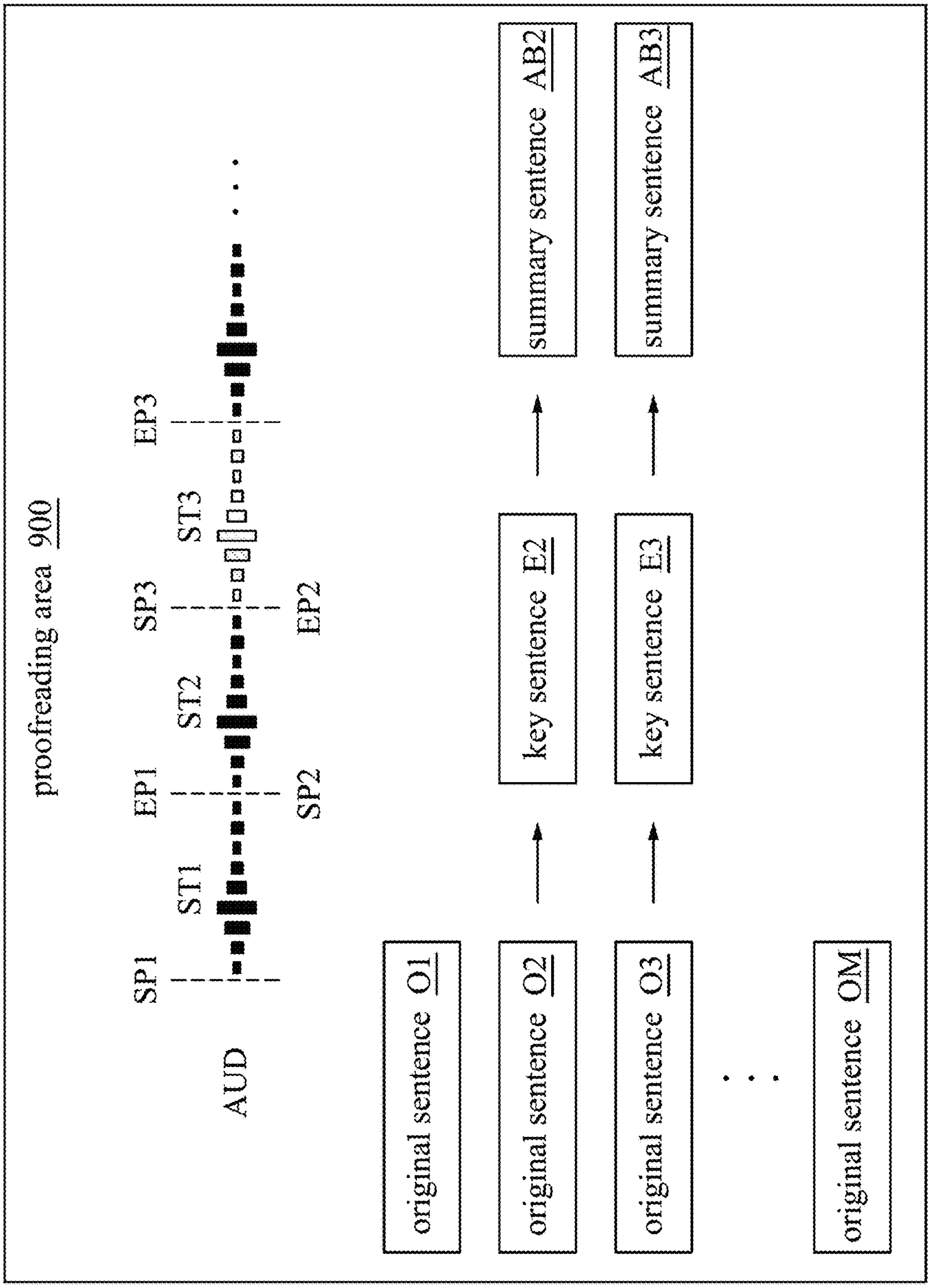
FIG. 9 is a schematic diagram illustrating a proofreading area in accordance with some embodiments of the present disclosure.

Reference is made to FIG. 9 together. FIG. 9 is a schematic diagram illustrating a proofreading area 900 in accordance with some embodiments of the present disclosure. As illustrated in FIG. 9, the original text data includes original sentences O1 to OM. The original sentence O1 corresponds to paragraph ST1 of the voice data AUD. The paragraph ST1 includes a starting position SP1 and an ending position EP1. The original sentence O2 corresponds to the paragraph ST2 of the voice data AUD. The paragraph ST2 includes a starting position SP2 and an ending position EP2. The original sentence O3 corresponds to paragraph ST3 of the voice data AUD. Paragraph ST3 includes a starting position SP3 and an ending position EP3.

In the embodiment of FIG. 9, the key sentence E2 and the key sentence E3 extracted by the key extraction module 134B correspond to the original sentence O2 and the original sentence O3 respectively.

As illustrated in FIG. 9, the summary generated according to the key sentences E2 and E3 includes summary sentences AB2 and AB3. In some embodiments, the summary sentence AB2 corresponds to the key sentence, and the summary sentence AB3 corresponds to the key sentence E3. It should be noted that, the correspondence between the summary sentence and key sentence is not limited to the embodiments mentioned above. In some other embodiments, the summary sentence AB2 can correspond to the key sentences E2 and E3 simultaneously, and the summary sentence AB3 can also correspond to the key sentences E2 and E3 simultaneously.

In some embodiments, according to the embodiments of FIG. 9, the association table generated by the summary proofreading module 139B in FIG. 7 is shown as Table 2 below.

TABLE 2

| summary sentence | key sentence |
|---|---|
| AB1 | E1 |
| AB2 | E2 |
| . . . | . . . |

According to the association table as mentioned above, the processor 130 in FIG. 1 can know that the summary sentence AB1 corresponds to the key sentence E1, the summary sentence AB2 corresponds to the key sentence E2.

In some embodiments, the association table (Table 2) as mentioned above is constructed according to the association between the summary sentences and the key sentences. In detail, in some embodiments, the processor 130 in FIG. 1 calculates the repeating frequency between several summary words of the summary sentences and the several key words of the several key sentences. When the repeating frequency is larger than the preset threshold, the association between the summary sentences and the key sentences in the association table is constructed.

For example, when the repeating frequency between the several summary words of the summary sentence AB1 and several key words of the key sentence E1 is larger than the preset threshold, the processor 130 constructs the association between the summary sentence AB1 and the key sentence E1 in the association table. On the contrary, when the repeating frequency between several summary words of the summary sentence AB1 and several key words of the key sentence E2 is not larger than the preset threshold, the processor 130 does not construct the association between the summary sentence AB1 and the key sentence E2 in the association table.

Reference is made to FIG. 8 again. In operation S840, whether correcting the summary is needed is determined. In some embodiments, operation S840 is performed by the summary proofreading module 139B as illustrated in FIG. 7. In some embodiments, the output module 114 in FIG. 1 displays summary sentences (summary sentences AB2, AB3 as shown in FIG. 9) in the proofreading area 900 as shown in FIG. 9. In some embodiments, according to the displayed proofreading area 900, the user can browse the summary sentence and determine whether the summary sentence needs to be corrected.

In some embodiments, when the user determines that correcting the summary sentences is needed, the user sends the command to the summary generation device 100 through the input module 112 as shown in FIG. 1.

In some embodiments, when the processor 130 receives the command of correcting the summary sentences, operation S845 is performed. When the processor 130 does not receive the command of correcting the summary sentences, or the processor 130 receives the command of not correcting the summary sentences, operation S850 is performed.

In operation S845, correcting and updating the original text data based on the voice data by utilizing the association table and the voice to text correspondence table. In some embodiments, operation S845 is performed by the summary proofreading module 139B in FIG. 7. In some embodiments, in operation S845, when processor 130 receives the command of correcting the summary sentences, according to the summary sentences corresponding to the command, the processor 130 searches the association table to retrieve the key sentences corresponding to the summary sentences. For example, reference is made to FIG. 9 together. When the command corresponds to the summary sentence AB2, according to the command, the processor 130 searches the association table to retrieve the key sentence E2 corresponding to the summary sentence AB2.

In some embodiments, in operation S845, according to key sentence E2, the processor 130 in FIG. 1 obtains the original sentence O2 corresponding to the key sentence E2. Then, according to the original sentence O2, according to the voice to text correspondence table as shown in Table 1 above, the output module 114 in FIG. 1 plays the paragraph ST2 of the voice data AUD corresponding to the key sentence E2, users can correct the original sentence corresponding to the paragraph based on the played voice data.

In short, when the command includes correcting the summary sentence AB2, after the processor 130 retrieves the summary sentence AB2, the output module 114 in FIG. 1 plays the paragraph ST2 of the voice data AUD based on the association table and the voice to text correspondence table.

In some embodiments, when the summary sentences are corrected, the summary proofreading module 139B updates the original sentences corresponding to the key sentences associated with the summary sentences according to the voice to text correspondence table as shown in Table 1 above and the association table as shown in Table 2 above. For example, in an embodiment, when the summary sentence AB2 is corrected, the summary proofreading module 139B updates the original sentence O2 corresponding to the key sentence E2 associated with the summary sentence AB2.

Reference is made to FIG. 8 again. As illustrated in FIG. 8. In some embodiments, after performing operation S845, operation S820 is performed again, so as to generate the key sentences according to the corrected original sentences. Operation S830 and operation S840 are performed again, so as to generate the summary again according to the key sentences, and to determine whether correcting the key sentences is needed according to the summary.

In operation S850, the summary is output. In some embodiments, the output module in FIG. 1 outputs the generated summary, including displaying the summary via a display device.

In the summary generation method 800 as described above, the user only needs to browse the summary to determine whether to correct the original text data, and there is no need to browse the entire original text data.

Figure 10:
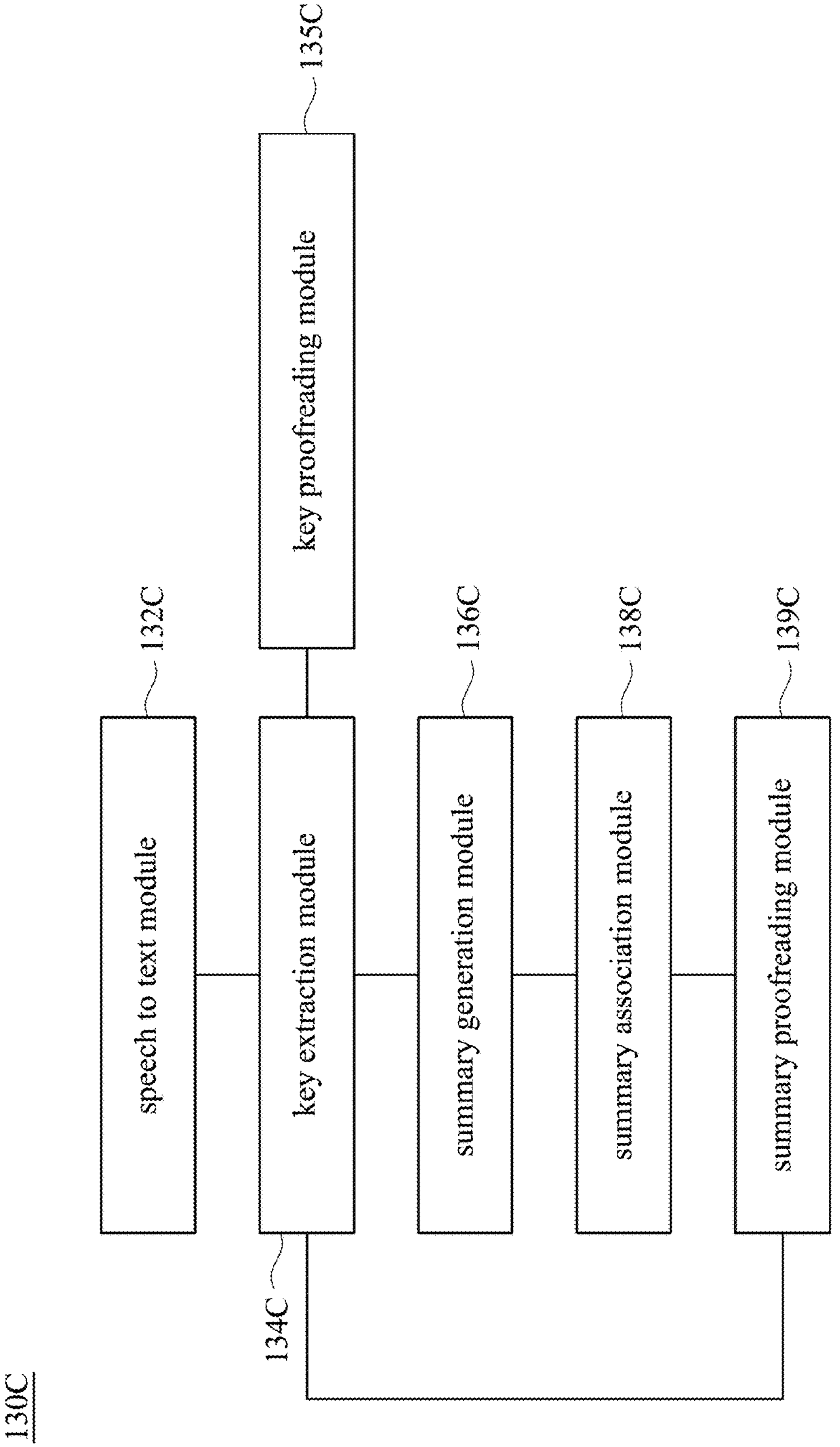
FIG. 10 is another schematic diagram illustrating a processor in accordance with some embodiments of the present disclosure.

Reference is made to FIG. 10 together. FIG. 10 is another schematic diagram illustrating a processor 130C in accordance with some embodiments of the present disclosure. The processor 130C in FIG. 10 is another embodiment of the processor 130 in FIG. 1.

As illustrated in FIG. 10, the processor 130C includes a speech to text module 132C, a key extraction module 134C, a key proofreading module 135C, a summary generation module 136C, a summary association module 138C and a summary proofreading module 139C.

In the connection relationship, the speech to text module 132C is coupled to the key extraction module 134C, the key extraction module 134C is coupled to the key proofreading module 135C and the summary generation module 136C, the summary generation module 136C is coupled to the summary association module 138C, the summary association module 138C is coupled to the summary proofreading module 139C, and the summary proofreading module 139C is coupled to the key extraction module 134C.

Figure 11:
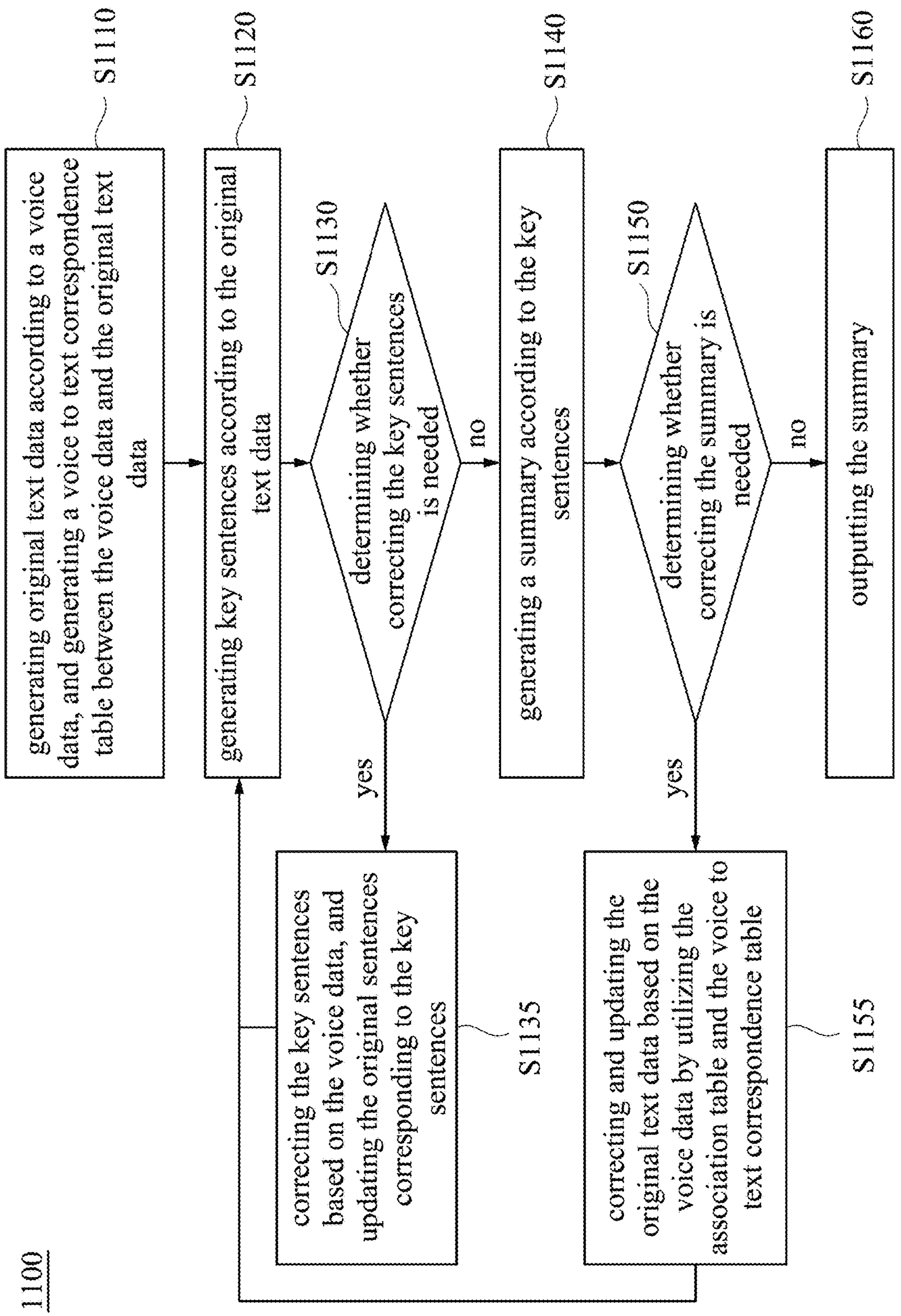
FIG. 11 is a flowchart illustrating another summary generation method in accordance with some embodiments of the present disclosure.

Reference is made to FIG. 11 together. FIG. 11 is a flowchart illustrating another summary generation method 1100 in accordance with some embodiments of the present disclosure.

The summary generation method 1100 can be applied to the summary generation device 100 in FIG. 1 or a system with the same or similar structure. In order to make the description simple, the following will take FIG. 1 and FIG. 10 as examples to describe the operation method. However, the embodiments of the present disclosure are not limited to the applications of FIG. 1 and FIG. 10.

Reference is made to FIG. 11. The summary generation method 1100 includes the following operations S1110 to S1155. The details of the summary generation method 1100 will be explained in FIG. 1 and FIG. 10 below.

In operation S1110, original text data is generated according to a voice data, and a voice to text correspondence table between the voice data and the original text data is generated. In some embodiments, operation S1110 is performed by the speech to text module 132C in FIG. 10. The implementation of operation S1110 is similar to operation S310 in FIG. 3 and will not be described in detail here.

In operation S1120, the key sentences are generated according to the original text data. In some embodiments, operation S1120 is performed by the key extraction module 134C in FIG. 10. The implementation of operation S1120 is similar to operation S320 in FIG. 3 and will not be described in detail here.

In operation S1130, whether correcting the key sentences is needed is determined. In some embodiments, operation S1130 is performed by the key proofreading module 135C in FIG. 10. In some embodiments, when the key sentences need to be corrected, operation S1135 is performed. When the key sentences do not need to be corrected, operation S1140 is performed. The implementation of operation S1130 is similar to operation S330 in FIG. 3 and will not be described in detail here.

In operation S1135, the key sentences are corrected based on the voice data, and the original sentences corresponding to the key sentences are updated. In some embodiments, operation S1135 is performed by the key proofreading module 135C in FIG. 10. The implementation of operation S1135 is similar to operation S335 in FIG. 3 and will not be described in detail here.

In operation S1140, a summary is generated according to the key sentences. In some embodiments, operation S1140 is performed by the summary generation module 136C in FIG. 10. The implementation of operation S1140 is similar to operation S340 in FIG. 3 and will not be described in detail here.

In operation S1150, whether correcting the summary is needed is determined. In some embodiments, operation S1150 is performed by the summary proofreading module 139C in FIG. 10. In some embodiments, when correcting the summary sentences is needed, operation S1155 is performed. When correcting the summary sentences is not needed, operation S1160 is performed. The implementation of operation S1150 is similar to operation S840 in FIG. 8 and will not be described in detail here.

In operation S1155, the original text data is corrected and updated based on the voice data by utilizing the association table and the voice to text correspondence table. In some embodiments, operation S1155 is performed by the summary proofreading module 139C in FIG. 10. The implementation of operation S1155 is similar to operation S845 in FIG. 8 and will not be described in detail here.

In operation S1160, the summary is output. In some embodiments, the output module in FIG. 1 outputs the generated summary, including displaying the summary via a display device. The implementation of operation S1160 is similar to operation S850 in FIG. 8 and will not be described in detail here.

In the summary generation method 1100 as described above, Users can determine whether to correct the original text data by browsing the key sentences and summary, and there is no need to browse the entire original text data.

It should be noted that, in some embodiments, the summary generation methods 300, 800, 1100 can also be implemented as a computer program or command, and can be stored in memory 150 as shown in FIG. 1, so that the processor 130 of the summary generation device 100 in FIG. 1 performs the operation method after reading the computer program or the command. The processor 130 can be composed of one or several chip groups. The memory 150 can be read-only memory, flash memory, floppy disk, hard disk, optical disk, pen drive, tape, database accessible from the network or a non-transitory computer readable storage medium with the same or similar functions those familiar with this field can easily think of.

In addition, it should be noted that the operations of the summary generation methods 300, 800, and 1100 mentioned in the embodiments, no particular sequence is required unless otherwise specified. Moreover, the operations may also be performed simultaneously or the execution times thereof may at least partially overlap. Furthermore, the operations of the parameter calibration method 400 may be added to, replaced, and/or eliminated as appropriate, in accordance with various embodiments of the present disclosure.

In some embodiments, the processor 130 in FIG. 1 can be a server, a circuit, a central processing unit (CPU), a microprocessor (MCU) or other circuits, elements or devices with same or similar functions such as storage, calculation, data reading, signals or messages receiving, signals or messages transmitting, etc. In some embodiments, the input-output circuit 110 in FIG. 1 can be a circuit or an element with functions of signal output/input, message output/input or similar functions.

In some embodiments, the input module 112 in FIG. 1 can be a circuit or component with signal input, message input or similar functions. The output module in FIG. 1 can be a circuit or component with signal output, message output or similar functions.

In some embodiments, the speech to text module 132A, the key extraction module 134A, the key proofreading module 135A, the summary generation module 136A, the summary association module 138A in FIG. 2, the key extraction units 134*a*1 to 1343*a*3, the key extraction decision module 134*b* in FIG. 4A, the speech to text module 132B, the key extraction module 134B, the summary generation module 136B, the summary association module 138B, and the summary proofreading module 139B in FIG. 7, the speech to text module 132C, the key extraction module 134C, the key proofreading module 135C, the summary generation module 136C, summary association module 138C, and the summary proofreading module 139C in FIG. 10 can all be implemented as circuits or elements.

Through the operations of various embodiments described above, a summary generation device and a summary generation method are implemented. By displaying the key sentences and summary sentences at the proofreading area, users only need to browse the key sentences or summary sentences to correct the original text data, and the key sentences and the summary sentences are generated again according to the corrected original text data. The summary is generated until no correcting is needed. The above process generates the summary through key sentences (instead of through the original text data), which can save the calculation amount required for generating the summary. Furthermore, since the user only needs to browse the key sentences and the summary sentences, the manpower can be saved, and the possibility of errors in the conference summary due to speech recognition errors can be reduced. Moreover, through the construction of the association table and the voice to text correspondence table, the original sentence and the corresponding paragraph of voice data can be traced from the key sentence, or the key sentence, the original sentence and the paragraph corresponding to the voice data can be traced from the summary sentence, which is more convenient when correcting the original text data.

In addition, the above examples include sequential demonstration operations, but the operation does not have to be performed in the sequence displayed. Performing the operations in different sequence is within the scope of this disclosure. Within the spirit and scope of the embodiments of the present disclosure, the operations may be added, substituted, changed in sequence and/or omitted as appropriate. The above "first" and "second" are only used to distinguish the same statement, and are not used to limit the statements to have any order, nor to limit the statements to the operations involved in any order.

It will be apparent to those skilled in the art that various modifications and variations can be made to the structured of the present invention without departing from the scope or spirit of the invention. In view of the foregoing, it is intended that the present invention cover modifications and variations of this invention provided they fall within the scope of the following claims.

What is claimed is:

1. A summary generation device, comprising:

an input-output circuit, configured to receive a voice data; and a processor, coupled to the input-output circuit, configured to perform:

operation 1: generating original text data according to the voice data, and generating a voice to text correspondence table between the voice data and the original text data, wherein the original text data comprises a plurality of original sentences, the voice to text correspondence table comprises the plurality of original sentences and a starting position and an ending position in the voice data corresponding to each of the plurality of original sentences;

operation 2: retrieving at least one of the plurality of original sentences to generate at least one key sentence according to the original text data;

operation 3: correcting the at least one key sentence based on the voice data, and updating at least one of the plurality of original sentences corresponding to the at least one key sentence;

operation 4: repeating the operation 2 and the operation 3, until the at least one key sentence is determined that there is no need to correct; and operation 5: generating a summary according to at least one of updated key sentence.

2. The summary generation device of claim 1, wherein the operation 3 further comprising:

displaying the at least one key sentence at a proofreading area, and playing the voice data of at least one of the plurality of original sentences corresponding to the at least one key sentence, so as to correct the at least one key sentence displayed at the proofreading area.

3. The summary generation device of claim 2, wherein the operation 3 further comprising:

playing the voice data corresponding to the at least one key sentence according to the voice to text correspondence table.

4. The summary generation device of claim 1, wherein the operation 2 further comprising:

extracting a plurality of alternative key sentence groups from the original text data according to an extraction ratio, and extracting the at least one key sentence from the plurality of alternative key sentence groups according to a preset key extraction ratio.

5. The summary generation device of claim 1, wherein the processor is further configured to perform:

operation 6: correcting the original text data according to an association table and the voice to text correspondence table after generating the summary, wherein the association table is constructed according to an association between at least one summary sentence of the summary and the at least one key sentence.

6. The summary generation device of claim 5, wherein the operation 6 further comprises:

calculating a repeating frequency between a plurality of summary words of the at least one summary sentence and a plurality of key words of the at least one key sentence; and when the repeating frequency is larger than a preset threshold, constructing the association between the at least one summary sentence and the at least one key sentence at the association table.

7. The summary generation device of claim 5, wherein the processor is further configured to perform:

operation 7: repeating the operation 2 to the operation 6, until the original text data is determined that there is no need to correct.

8. A summary generation device, comprising:

an input-output circuit, configured to receive a voice data; and a processor, coupled to the input-output circuit, configured to perform:

operation 1: generating original text data according to the voice data, and generating a voice to text correspondence table between the voice data and the original text data, wherein the original text data comprises a plurality of original sentences, the voice to text correspondence table comprises the plurality of original sentences and a starting position and an ending position in the voice data corresponding to each of the plurality of original sentences;

operation 2: retrieving at least one of the plurality of original sentences to generate at least one key sentence according to the original text data;

operation 3: generating a summary according to the at least one key sentence, and generating an association table, wherein the association table is constructed according to an association between at least one summary sentence of the summary and the at least one key sentence;

operation 4: correcting and updating the original text data based on the voice data by utilizing the association table and the voice to text correspondence table; and operation 5: repeating the operation 2 to the operation 4, until the original text data is determined that there is no need to correct.

9. The summary generation device of claim 8, wherein the operation 4 further comprising:

searching the at least one key sentence corresponding to the at least one summary sentence according to the association table when receiving a command corresponding to the at least one summary sentence;

playing the voice data corresponding to the at least one key sentence according to the voice to text correspondence table.

10. The summary generation device of claim 8, wherein the operation 2 further comprises:

extracting a plurality of alternative key sentence groups from the original text data according to an extraction ratio, and extracting the at least one key sentence from the plurality of alternative key sentence groups according to a preset key extraction ratio.

11. A summary generation method, comprising:

operation 0: receiving a voice data;

operation 1: generating original text data according to the voice data, and generating a voice to text correspondence table between the voice data and the original text data, wherein the original text data comprises a plurality of original sentences, the voice to text correspondence table comprises the plurality of original sentences and a starting position and an ending position in the voice data corresponding to each of the plurality of original sentences;

operation 2: retrieving at least one of the plurality of original sentences to generating at least one key sentence according to the original text data;

operation 3: correcting the at least one key sentence based on the voice data, and updating at least one of the plurality of original sentences corresponding to the at least one key sentence;

operation 4: repeating the operation 2 and the operation 3, until the at least one key sentence is determined that there is no need to correct; and operation 5: generating a summary according to at least one of updated key sentence.

12. The summary generation method of claim 11, wherein the operation 3 further comprises:

displaying the at least one key sentence at a proofreading area, and playing the voice data of at least one of the plurality of original sentences corresponding to the at least one key sentence, so as to correct the at least one key sentence displayed at the proofreading area.

13. The summary generation method of claim 12, wherein the operation 3 further comprises:

playing the voice data corresponding to the at least one key sentence according to the voice to text correspondence table.

14. The summary generation method of claim 11, wherein the operation 2 further comprises:

extracting a plurality of alternative key sentence groups from the original text data according to an extraction ratio, and extracting the at least one key sentence from the plurality of alternative key sentence groups according to a preset key extraction ratio.

15. The summary generation method of claim 11, further comprising:

operation 6: correcting the original text data according to an association table and the voice to text correspondence table after generating the summary, wherein the association table is constructed according to an association between at least one summary sentence of the summary and the at least one key sentence.

16. The summary generation method of claim 15, wherein the operation 6 further comprises:

calculating a repeating frequency between a plurality of summary words of the at least one summary sentence and a plurality of key words of the at least one key sentence; and when the repeating frequency is larger than a preset threshold, constructing the association between the at least one summary sentence and the at least one key sentence at the association table.

17. The summary generation method of claim 15, further comprising:

operation 7: repeating the operation 2 to the operation 6, until the original text data is determined that there is no need to correct.

* * * * *